United States Patent [19]

Ullman

[11] 4,053,082
[45] Oct. 11, 1977

[54] ELECTRICAL OUTLET BOX ASSEMBLY

[75] Inventor: Frederick E. Ullman, Glencoe, Ill.

[73] Assignee: Unarco Industries, Inc., Del.

[21] Appl. No.: 662,569

[22] Filed: Mar. 1, 1976

[51] Int. Cl.² .................. H02G 3/12; F16F 15/00
[52] U.S. Cl. .................. 220/3.6; 248/27.1;
    248/318; 248/DIG. 6
[58] Field of Search ............... 220/3.3, 3.4, 3.5, 3.6,
    220/3.7, 3.9, 3.92, 18; 174/48, 49, 58; 248/27.1,
    311, 312, 313, 316 C, 318, 343; DIG. 6; 240/78
    H, 78 HA, 78 B

[56] References Cited

U.S. PATENT DOCUMENTS

| | | | |
|---|---|---|---|
| 1,888,847 | 11/1932 | Carlson et al. | 220/3.6 |
| 2,193,820 | 3/1940 | Knight | 248/27.1 |
| 2,209,146 | 7/1940 | Bessette | 220/3.9 |
| 2,562,344 | 7/1951 | Tranas | 220/3.9 |
| 2,587,423 | 2/1952 | Young | 220/3.6 X |
| 3,229,939 | 1/1966 | Hubbard | 248/27.1 |
| 3,261,577 | 7/1966 | Gryse et al. | 248/27.1 |
| 3,285,548 | 11/1966 | Matto et al. | 248/27.1 |
| 3,286,090 | 11/1966 | Brown | 240/78 H |
| 3,593,020 | 7/1971 | Donato | 248/318 X |
| 3,697,742 | 10/1972 | Bobrick | 240/78 HA |
| 3,744,748 | 7/1973 | Harrold | 248/27.1 |
| 3,845,925 | 11/1974 | Edwards | 248/27.1 |
| 3,871,606 | 3/1975 | Larson et al. | 248/27.1 |

FOREIGN PATENT DOCUMENTS 2,506,725  8/1975  Germany .................. 174/58

Primary Examiner—Stephen Marcus

[57] ABSTRACT

An electric box assembly is proportioned to be inserted into a panel opening and be retained therein. The assembly includes a discontinuous ring member that can be spread apart from an intermediate relaxed position and inserted through the panel opening, and then compressed to telescopically insert the ring member in the panel opening. The ring member has an outwardly extending flange for engagement with the outer surface of the panel, and an inwardly directed first cam means. The assembly also includes an outlet box member adapted to be positioned within the ring member and locked thereto. The outlet box member has an outwardly extending flange for engagement with the inner surface of the panel, and an outwardly directed second cam means which engages the first cam means when the outlet box member is rotated relative to the ring member. The first and second cam means cooperate to move the flanges toward one another and into clamping engagement with the panel thereby accommodating panels of differing thickness. The second cam means may comprise a plurality of sets of lugs to enable the assembly to accommodate panels having a different range of thicknesses. The flange on the ring member is preferably offset with respect to the axis of the ring, so that the ring is reversible to provide a further means for compensating panels of varying thickness.

24 Claims, 7 Drawing Figures

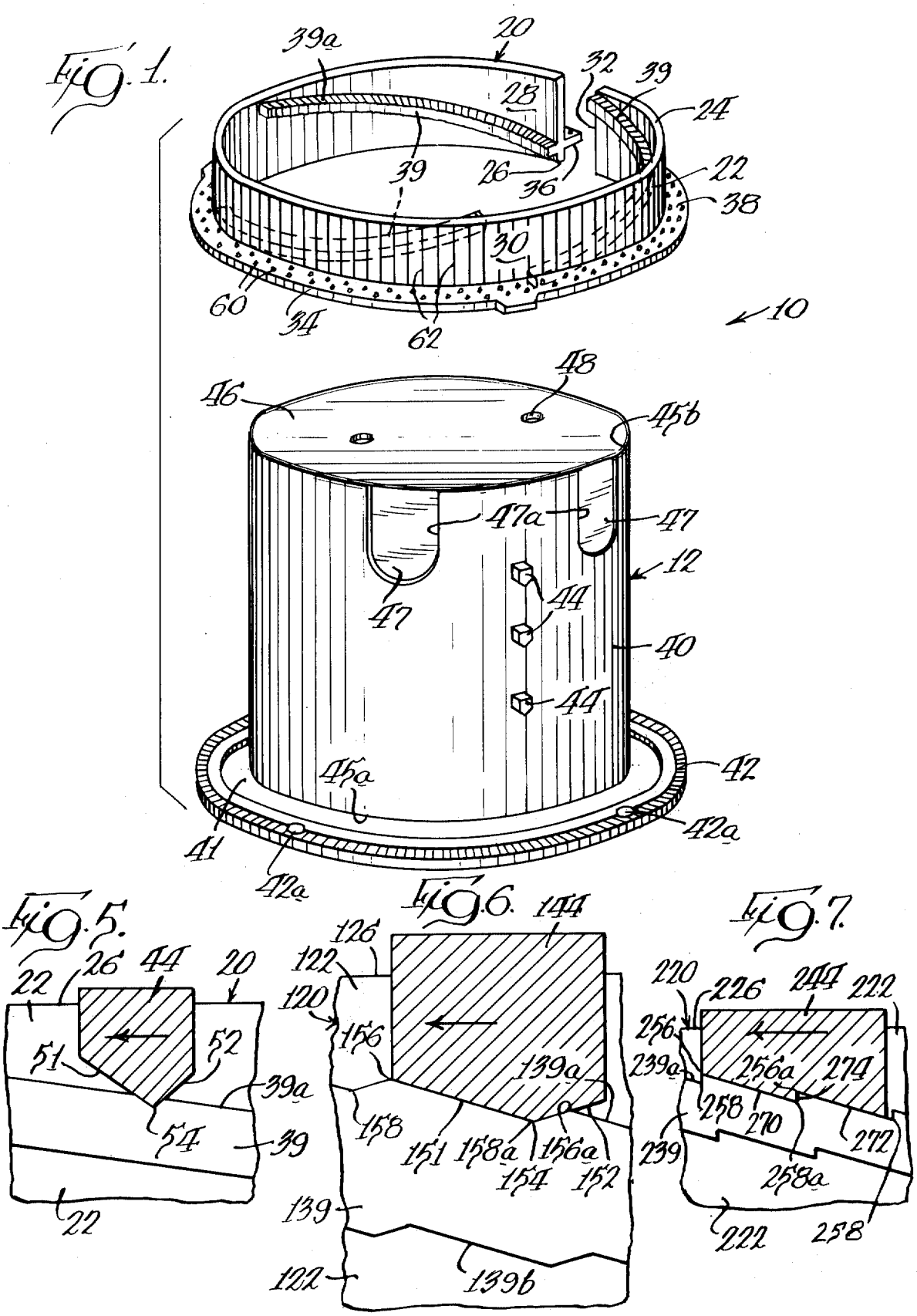

U.S. Patent  Oct. 11, 1977  Sheet 2 of 2  4,053,082
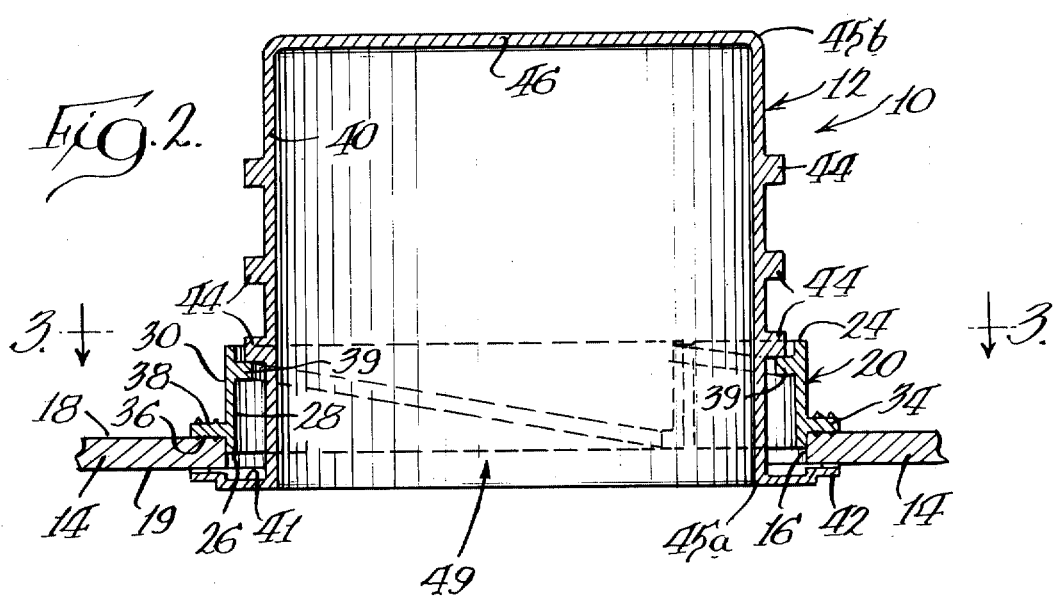
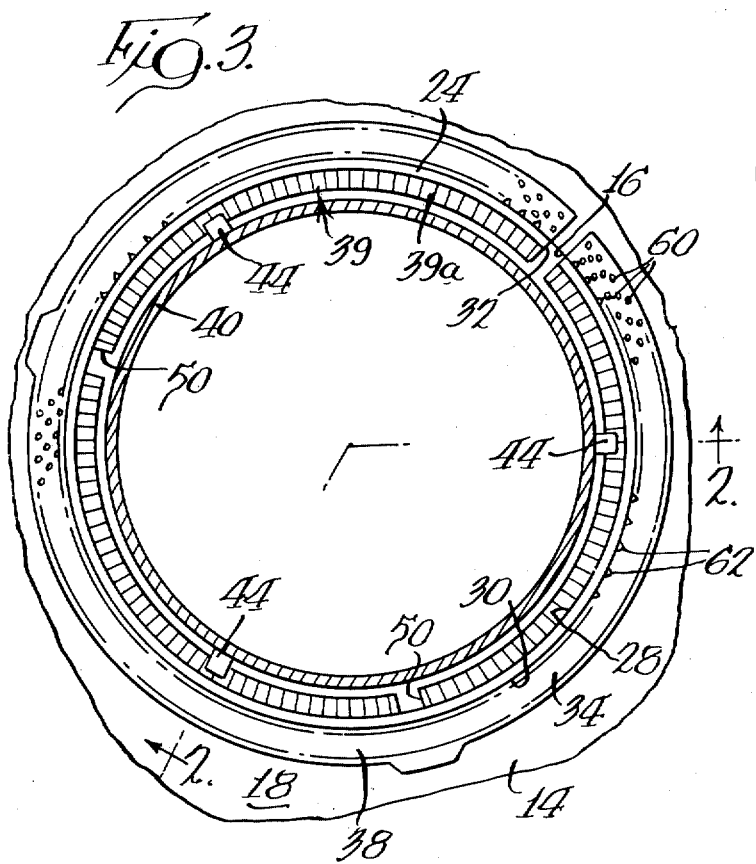
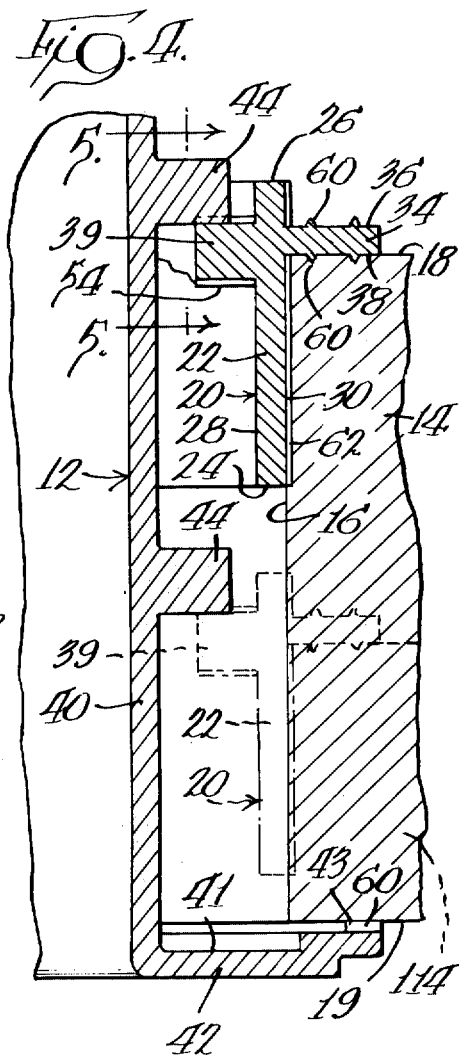

ELECTRICAL OUTLET BOX ASSEMBLY

BACKGROUND OF THE INVENTION

This invention relates to a novel electric box assembly for mounting electrical components, such as receptacles and switches, and particularly to an improved plastic electric box assembly which is especially adapted for use in wiring systems for mobile homes and the like. The electric box assembly of the present invention has particular utility in a ceiling panel, although it will be evident from the following description that it may also be used in a wall panel, or the like.

A large variety of electrical boxes for receiving electrical components have been developed and are available on the market. Some of these are metallic, and others are of plastic and of glass fiber reinforced plastic materials. Most of the boxes currently available require the use of extraneous fasteners, such as nails, screws, and the like, to secure them to a panel, such as a wall panel or ceiling panel, or to a panel supporting frame in order to comply with existing building codes.

The properties of wall and ceiling panels in mobile homes have been found to vary significantly. Wall panels are usually formed from materials that are relatively thin, rigid and strong, while ceiling panels are conventionally formed from thicker materials that are relatively soft and weak, such as sound deadening materials. Most ceiling box installations require reinforcing or load spreading members above the ceiling panels to spread the weight of the fixtures that are hung from the boxes, and/or to provide a suitable anchor for screws used to hold the boxes place and support the fixtures. The total thickness of panels with reinforcing members, where used, has been found to vary from 0.140 inches to 1.50 inches.

Where a ceiling reinforcing member is required, it is necessary that it be fastened to the ceiling framework, or manually held from above the ceiling when installing the electric box. Such reinforcing members are commonly referred to as "donuts," and consist of a relatively rigid member, such as a piece of plywood, having a hole therein disposed in alignment with a hole in the ceiling panel. To secure such a member in place, some manual installation work must be done from above the ceiling panel prior to, or during, installation of the electric box. Usually a workman must hold the donut in place above the panel while another workman drives the screws, which hold the box in place, through the panel into the donut. Likewise, when an electric box is secured to a wall panel by means of screws and a reinforcing member is required, two workmen are required for the installation, one to hold the donut behind the panel, and the other to insert the box and drive the screws from the front of the panel.

Commonly assigned U.S. Pat. No. 3,848,764 to Salg discloses an electric box that can be affixed to a panel without the use of extraneous fasteners. A panel securing assembly is employed which is preferably integrally formed with the electric box structure and includes at least two spaced stop members and cooperable deflectable resilient spring fingers. The spring fingers deflect inwardly when the box structure is inserted in an opening in the panel, and then return to their outwardly sprung position so that the panel is positioned between the stop members and spring fingers. The electric box is limited to panel installations where the panels are made of a relatively dense and strong material and do not vary greatly in thickness.

The electric box disclosed in commonly assigned U.S. Pat. No. 3,891,113 to Salg is an improvement over the electrical box disclosed in U.S. Pat. No. 3,848,764 in that the sidewall of the box is continuous and flexes inwardly when the box is inserted into a panel opening. The rigidity of this electric box prevents it from being used in most ceiling panels because most ceiling materials are soft and weak and do not have sufficient stiffness or rigidity for accepting this type of "snap-in" type of electic box.

And, because of their structural configuration, the electric boxes disclosed in the above-mentioned commonly assigned patents are more or less limited to a panel of given thickness, which is satisfactory for wall panels that are generally uniform in thickness throughout the industry, but which is not completely satisfactory for ceiling panels which vary greatly in thickness.

Thus, in spite of the improvements provided by the electric boxes disclosed in the aforementioned patents, a need remains in connection with electric boxes that can be readily installed in weak, soft panels of varying thicknesses without the use of extraneous fasteners, and/or reinforcing members.

SUMMARY OF THE INVENTION

In accordance with this invention, an electric box assembly is provided for mounting within an opening in a panel having outer and inner surfaces, and which can be installed by a single workman from inside the panel without extraneous fasteners and manual assistance from outside the panel, and which will distribute the fixture load on the panel so that no reinforcing member is required. The panel may be a wall panel or a ceiling panel, such as a wood, synthetic hardboard, sound absorbent board, or plasterboard, etc. In each case, the panel is provided with a suitable opening through which the box assembly may be inserted so that the outlet box is recessed, in the usual fashion, behind the panel for receipt of an electrical component, such as a receptacle, switch or fixture, and so that electrical conductors may be brought to the box behind the panel through knock-outs provided in the box.

The electric box assembly comprises a ring member formed of a material with an inherently elastic memory and has a generally cylindrically-shaped sidewall adapted to be seated within the opening. The sidewall is discontinuous and defines a gap which permits the sidewall to be compressed from a relaxed position wherein the diameter of the outer surface is greater than the diameter of the opening, to a compressed position wherein the diameter of the outer surface is smaller than the diameter of the opening. The ring member further includes a flange extending outwardly from the outer surface of the sidewall and adapted to bear against the outer surface of the panel. The ring may be inserted from the inner side of the panel by spreading it apart to increase the aforesaid gap to a size larger than the panel thickness, inserting one end of the ring through the panel opening, and rotating the ring through the opening. Of course, if the gap of the ring sidewall is greater than the thickness of the panel, it is not necessary to spread the ring, and the ring may be installed by simply inserting one end of the ring through the opening, and rotating the ring until it is disposed outside the panel. Once the ring is outside the panel, the sidewall is compressed and telescopically inserted in the opening from the outside of the panel until the flange on the ring abuts the outer surface of the panel. The ring is then released and the inherent elastic memory of the sidewall urges the sidewall from the compressed position toward the relaxed position, and the sidewall assumes an intermediate compressed position with the outer surface of the sidewall being positioned in frictional retentive engagement with the wall of the panel which defines the opening. The entire manipulation of the ring can be readily accomplished by one person on one side (inside) of the panel. If desired, the ring can be installed from outside the panel, in which case a split ring is advantageous, but not necessary. It should also be noted that it is possible to install the ring members of the assemblies, where desired, prior to erection of the walls. And, the leads may be fed through the panel openings and connected to the appropriate component from inside, and the pre-wired box assembly connected to the ring by a simple twisting motion.

Means is provided on the inner surface of the ring sidewall defining a plurality of circumferentially spaced cam tracks inclined away from the end of the sidewall and which cooperate with cam follower means on the outlet box member to secure the box member to the panel. The outlet box member has a sidewall adapted to be positioned within the sidewall of the ring member, and a flange extends outwardly from the sidewall of the outlet box member and is adapted to bear against the inner surface of the panel. Cam follower means is provided on the outer surface of the sidewall of the outlet box member at a fixed distance from the flange thereon, and the cam follower means includes a plurality of circumferentially spaced lugs, each adapted to engage one of the cam tracks when the outlet box member is rotated relative to the ring member, whereby the cam track and cam follower means cooperate to move the flanges on the ring member and outlet box member toward one another and into parallel clamping engagement with the panel. The cam tracks and cam follower lugs are preferably equally circumferentially spaced, with at least three of such elements being most preferred to facilitate bringing said flanges into parallelism with one another. A plurality of sets of cam follower means at different distances from the outlet box flange may be provided, with the individual lugs of the cam follower sets axially aligned along the sidewall of the outlet box, so that the electric box assembly can accommodate panels within a great range of thicknesses.

It is a further feature of the invention that the ring member may be reversible, to further enable the electric box assembly to accommodate panels of greater variations in thickness. According to this feature, the flange on the ring member is positioned intermediate opposite ends of the sidewall and is disposed closer to one end of the sidewall than to the opposite end of the sidewall. The short section of the ring sidewall is inserted in the panel opening when the panel is relatively thin, and in order to insure that the very thin panels are clamped, the flange on the box member is recessed adjacent the box sidewall to define a well adapted to receive the end of the ring sidewall therein when the panel is clamped. The ring member is reversible from this position (short side in) to a position wherein the long section of the ring sidewall is inserted in the panel opening and the opposite surface of the ring flange bears against the outer surface of the panel, thereby enabling clamping of the box and ring on thicker panels.

Such electric box assemblies are quickly, easily and firmly secured directly to a panel without fasteners. The outlet box of the assembly is locked to the panel with sufficient tenacity, so as to resist dislodgment during severe vibration which occurs in over-the-road travel, but the mounting of the outlet box is such that it can be readily removed, when desired.

In contrast, prior art constructions require extraneous fasteners, and frequently electric boxes are secured to studs, or furring strips or other framing, or panel reinforcing members, after which the panels are secured to the framing. In most cases, such expedients are not necessary in accordance with this invention which is a great advantage, particularly for the mobile home industry. However, where a panel member is extremely soft or weak, a reinforcing member may be clamped in place behind the panel by the box and ring assembly, if desired.

BRIEF DESCRIPTION OF THE DRAWINGS

FIG. 1 is an exploded view of the electric box assembly of the present invention;

FIG. 2 is a cross-sectional view through the center of the electric box assembly of FIG. 1 in clamping engagement with a panel;

FIG. 3 is a cross-sectional view taken along plane 3—3 in FIG. 2;

FIG. 4 is an enlarged fragmentary cross-sectional view showing in solid lines the electric box assembly engaging a panel having a first thickness, and showing in phantom the electric box assembly engaging a panel having a lesser thickness, both showing the ring member in a position reversed with respect to the position shown in FIG. 2;

FIG. 5 is an enlarged fragmentary cross-sectional view taken generally along plane 5—5 in FIG. 4; and FIGS. 6 and 7 are fragmentary cross-sectional views, similar to FIG. 5, and showing other embodiments of the invention.

DESCRIPTION OF THE PREFERRED EMBODIMENT

While this invention is susceptible of embodiment in many different forms, there is shown in the drawings and will herein be described in detail preferred embodiments of the invention, with the understanding that the present disclosure is to be considered as an exemplification of the principles of the invention, and is not intended to limit the invention to the embodiments illustrated. The scope of the invention will be pointed out in the appended claims.

Referring to the drawings, the electric box assembly 10 of this invention comprises an outlet box member 12 and ring member 20 adapted to be secured to a panel 14 in an appropriately cut-out generally circular panel opening 16. The panel 14 may comprise a wall panel or a ceiling panel having outer surface 18 and inner surface 19. The outlet box 12 is proportioned to mount a conventional electrical component. Box 12 is formed of a suitable material, preferably plastic, and is preferably molded.

The ring member 20 is formed of a suitable material incorporating elastic properties and which provides an inherently elastic memory. Plastic materials such as Lexan are well suited for purposes of the present invention, and other suitable materials will suggest themselves to those skilled in the art. Ring member 20 has a generally cylindrically-shaped sidewall 22 adapted to be seated within opening 16. The sidewall 22 has first and second parallel ends 24, 26, an inner surface 28 and an outer surface 30. Sidewall 22 is discontinuous and defines a gap 32 which permits sidewall 22 to be compressed from a relaxed position (FIG. 1) wherein the diameter of the outer surface 30 is greater than the diameter of opening 16, to a compressed position wherein the diameter of the outer surface 30 is smaller than the perimeter of opening 16. When the ring member is inserted from inside the panel, the sidewall 22 is spread until the gap 32 is larger than the thickness of the panel, one end of the spread ring is inserted into the opening 16, and the ring is rotated until the entire ring passes through the opening to a position above the panel. The ring is then compressed so that the diameter of outer surface 30 is less than the diameter of opening 16, and the sidewall of the ring is telescopically inserted into opening 16 until flange 34 abuts the panel. The ring is then released, and the inherent elastic memory of sidewall 22 urges the sidewall from the compressed position toward the relaxed position to place the outer surface 30 of sidewall 22 in frictional retentive engagement with the wall of panel 14 which defines opening 16.

As shown in FIGS. 2 and 4, flange 34 extends outwardly from the outer surface 30 of sidewall 22 and has opposing surfaces 36, 38 parallel with sidewall ends 24 and 26. One of the flange surfaces (i.e., surface 36 in FIG. 2; surface 38 in FIG. 4) bears against the outer surface 18 of panel 14 when ring member 20 is positioned on panel 14. The inner surface 28 of ring member 20 is provided with a first cam means 39 comprising a plurality of circumferentially spaced cam tracks and each may comprise a thin rib having parallel, sloping outer surfaces 39a which are inclined with respect to the plane at the end of the sidewall. One end of each rib is adjacent to end 26 of sidewall 22, and the other end of the rib is adjacent to end 24 of sidewall 22, with the rib being generally uniformly inclined between opposing ends thereof.

Referring to FIGS. 1 and 3, first cam means 39 comprises a plurality of cam tracks which are equally spaced apart along the circumference of the inner surface 28 of sidewall 22, sidewall gap 32 defining the space between two adjacent cam tracks, and spaces 50 being defined between the other cam tracks. For example, three cam tracks 39 are illustrated in FIGS. 1 and 3. The cam tracks preferably are symmetrical and the same length.

Outlet box 12 has a sidewall 40 adapted to be positioned within the unitary, rigid sidewall 22 of ring member 20. A flange 42 extends outwardly from sidewall 40 and has surface 43 which is adapted to bear against inner surface 19 of panel 14 as shown in FIGS. 2 and 4. Fastening means, such as second cam means 44, is provided on sidewall 40 and is adapted to engage one surface 39a of first cam means 39 when the outlet box 12 is moved (rotated) relative to the ring member 20. Second cam means 44 comprises cam follower means, such as a plurality of sets of lugs, which extend outwardly from sidewall 40, and the sets of lugs are positioned in planes disposed at varying distances from flange 42. Each set of lugs includes at least two, and preferably three lugs, equally spaced apart in a plane positioned parallel to and at a fixed distance from flange 42. At least two, and preferably three (as shown) sets of lugs are provided, and for thicker panels, additional sets of lugs may be provided. Lugs 44 have a width smaller than spaces 32 and 50, so that when outlet box 12 is axially inserted within the sidewall 22 of ring member 20, the three circumferentially spaced lugs 44 can be passed through the spaces 32 and 50 between the three cam tracks 39. The outlet box 12 is then rotated less than one-third of a revolution to secure the outlet box on ring member 20 and complete the installation of assembly 10 in clamping engagement with panel 14. Where there are at least two lugs in each set, they engage cam tracks 39 at spaced apart locations, and the stresses imposed during clamping are thereby distributed along the circumference of the assembly.

Cam track 39 and cam follower means 44 cooperate to move the flanges 34 and 42 on the ring member 20 and outlet box 12 toward one another and into clamping engagement with panel 14. The inclined configuration of the cam track enables the assembly to accommodate panels of various thicknesses because the outlet box can be rotated until cam follower means 44 acts against cam track 39 to clampingly engage outlet box 12 with panel 14.

Sidewall 40 of outlet box 12 has a first end 45a and a second end 45b, and flange 42 extends outwardly from the first end 45a of the sidewall and has apertures 42a. A back wall 46 is provided which encloses the second end 45b of sidewall 40, the back wall 46 having apertures 48. The apertures 42a and 48 are adapted to receive screws or other fasteners (not shown) which can be used as an alternative means of securement or an optional supplementary securement means, if desired. Sidewall 40 together with back wall 46 define a hollow open outlet box structure having an expansive open front portion 49 (FIG. 2) spaced from back wall 46. Although outlet box 12 has been illustrated as being generally cylindrical, outlet boxes in accordance with this invention may be other shapes and may also be adapted to mount two or more electrical components.

According to a further feature of the present invention, ring member 20 is reversible to accommodate panels having a greater variety of thicknesses. Flange 34 is positioned intermediate first end 24 and second end 26 of sidewall 22 and is positioned closer to one of the ends, i.e., first end 24, than to the other of the ends, i.e., second end 26. When the panel is relatively thin, the ring member and outlet box are oriented as shown in FIG. 2, wherein the short section of sidewall 22 between flange 34 and end 26 is inserted in opening 16 in the panel and engages the wall of the opening, and surface 36 of flange 34 is adapted to bear against outer surface 18 of panel 14. To insure that very thin panels are clamped, flange 42 on outlet box 12 is recessed adjacent outlet box sidewall 40 to define a well 41 for receiving the end of sidewall 22 when the panel is clamped. To enable clamping of the outlet box and ring member on thicker panels, the ring member is reversible from the position shown in FIG. 2 to an orientation in which the long section of sidewall 22 between flange 34 and end 24 is inserted in opening 16 in the panel (FIG. 4) and engages the wall of the opening, and surface 38 of flange 34 is adapted to bear against outer surface 18 of panel 14. In FIG. 4, the ring member is also shown in phantom, clampingly engaging panel 114 which has a significantly lesser thickness than panel 14. A different set of lugs 44 engages cam tracks 39 where panel 14 has a lesser thickness than when panel 14 has a greater thickness.

Outlet box 12 also has suitable knock-outs 47 to enable the entry of electric cables (not shown) into the outlet box 12. Preferably the knock-outs are formed along thinned peripheral edges 47a so that they may be broken away from box 12, as by punching them out.

When a ring member 20 of the present invention is to be assembled to a panel 14 from outside the panel, it is necessary only to compress the ring member 20 and to telescopically insert the ring member in opening 16. When the ring member 20 is released, the inherent elastic memory of sidewall 22 urges the sidewall to the relaxed position wherein the sidewall is held with a spring-like force in frictional retentive engagement with the wall of panel 14 which defines opening 16. Outlet box 12 is then positioned within the sidewall 22 of ring member 20 and is inserted until second cam means 44 passes beyond first cam means 39, and is then rotated relative to ring member 12, whereby the cam track 39 and cam follower means 44 cooperate to move flanges 34 and 42 on ring member 20 and outlet box 12 toward one another and into clamping engagement with panel 14.

To lock the outlet box 12 on the ring member 20 as the outlet box is rotated, and thereby minimize the possibility of dislodgment of the outlet box from the ring member, the bottom surface of each lug 44 which is adapted to engage the cam track 39 may comprise a single flat, inclined surface disposed at an angle to the horizontal, or a pair of flat, inclined surfaces 51, 52 (FIGS. 1 and 5) which are angularly disposed relative to one another and intersect along a line 54, to define a tooth profile on the bottom of the lugs to facilitate engagement of the cam track by the lugs. Each lug 44 may be formed of a harder material than cam track 39, which may have a substantially smooth surface 39a for engagement by the lugs, whereby lugs 44 bite into the cam track 39 as the outlet box 12 is rotated relative to ring member 20 to releasably lock the outlet box on the ring member and retain the outlet box in position. It should be understood that as flanges 34 and 42 are brought into clamping engagement with the panel, and lugs 44 begin to bite into the cam tracks, the flanges may flex somewhat as the panel is compressed between the flanges.

Alternatively, as shown in FIG. 6 wherein the same last two digits in each numeral designate elements which are similar to FIG. 5, cam track 139 may comprise a ratchet means having a plurality of crests 156, 156a and troughs 158, 158a along opposite surfaces 139a and 139b of the cam track. One of the crests and troughs is disposed closest to end 126 of the inserted portion of the ring member, and each successive crest 156 and trough 158 is disposed further from end 126. The tooth-shaped lugs 144 are receivable in the troughs 158 or 158a between successive crests 156 or 156a to minimize the possibility of dislodgment of outlet box 12 from ring member 120 and retain outlet box 112 in position. Walls 150, 152 on lugs 144, and surfaces 139a on cam track 139, which are adapted to engage one another, can also be roughened to minimize the possibility of dislodgment of outlet box 112 from ring member 120 and to facilitate retention of outlet box 112 in position. The flanges on the ring member and outlet box flex against the opposite faces of the panel as the outlet box is tightened into position on the ring member and the lugs 144 are moved over each successive crest 156 or 156a and into an adjacent trough 158 or 158a.

A further embodiment is illustrated in FIG. 7 wherein the same last two digits of each reference numeral designate elements which correspond to the elements shown in FIGS. 5 and 6. As with the embodiment of FIG. 6, the cam track 239 of the embodiment of FIG. 7 includes a plurality of adjacent crests 256 and troughs 258, which are spaced at progressively increased distances from one end of the inclined cam track to the other. Troughs 258 have a stepped configuration, and include a pair of parallel inclined surfaces 270 and 272 connected by an upright locking surface 274 that is disposed parallel with the axis of the ring member 220.

Lugs 244 of the embodiment of FIG. 7 have a bearing profile on the lower surface thereof that is shaped generally complementarily with the shape of troughs 258. In this respect, the lower surface of lugs 244 includes two spaced parallel portions separated by an upright surface 256a that is adapted to engage cam track surface 274 and releasably lock the outlet box member against rotation relative to the ring member. It should be noted that the length of troughs 258 is greater than the lateral dimensions of lug 244, which insures that surfaces 256a and 274 will achieve their locking function by providing clearance so that the trailing end of the lug clears and does not interfere with the end of the preceding crest 256 when the lug traverses up the inclined cam track.

To facilitate in maintaining assembly 10 in position on panel 14, surfaces 36 and/or 38 of flange 34 which are adapted to bear against one surface of panel 14, and surface 43 on flange 42 of outlet box 12 which is adapted to bear against the opposite surface of panel 14, are provided with projections or teeth 60 (FIG. 4) which bite into panel 14 as assembly 10 is moved into clamping engagement with the panel. The projections 60 in flange 34 are particularly useful in that they prevent the ring member from rotating relative to the panel as the outlet box member is rotated relative to the ring member. Additionally, the outer surface 30 of sidewall 22 of ring member 20 can be provided with ribs 62 (FIG. 1) to increase the frictional retentive engagement between ring member 20 and panel 14.

I claim:

1. An electric box assembly for mounting an outlet box within an opening extending between opposite surfaces of a panel, comprising: a ring member formed of a material with an inherently elastic memory and having a generally cylindrically-shaped sidewall having inner and outer surfaces and adapted to be inserted into and seated within said opening, a flange extending outwardly from the outer surface of said sidewall and adapted to bear against one surface of said panel, and means on the inner surface of said sidewall defining cam track means inclined away from the inserted end of said ring member, said sidewall being discontinuous and defining a gap to permit said ring member sidewall to be spread apart from a relaxed position, wherein the diameter of said outer surface is greater than the diameter of said opening, to a spread position wherein the gap is greater than the thickness of the panel whereby the ring member may be inserted through said panel opening by (1) placing one portion of the sidewall adjacent the gap outside the panel, and (2) rotating the ring member relative to the panel to position the entire ring member outside the panel and in the relaxed position said ring member then being insertable in said opening by (1) compressing the ring member from said relaxed position to a compressed position wherein the diameter of said outer surface is smaller than the diameter of said opening, (2) telescopically inserting said ring member in said opening until the flange thereon engages said one panel surface, and (3) releasing the force compressing said ring member whereby the inherent elastic memory of said ring member urges said sidewall toward said relaxed position to position the outer surface of said sidewall in frictional retentive engagement with the wall of said opening; and an outlet box member having a sidewall adapted to be positioned within the sidewall of said ring member, a flange extending outwardly from the sidewall of said outlet box member and adapted to bear against the surface of said panel opposite from the surface engaged by the flange on said ring member, and cam follower means on the sidewall of said outlet box member and adapted to engage said cam track means when said outlet box member is rotated relative to said ring member, whereby said cam track means and cam follower means cooperate to move the flanges on said ring member and outlet box member toward one another and into clamping engagement with said panel.

2. An electric box assembly as defined in claim 1 in which said cam track means comprises a plurality of cam tracks which are spaced apart on the inner surface of said ring member sidewall, and wherein said cam follower means comprises a plurality of lugs spaced apart on the outer surface of said outlet box sidewall, said lugs each being adapted to cooperate with one of said cam tracks, and said lugs each having a dimension less than the space between adjacent cam tracks, whereby said outlet box member can be inserted within the sidewall of said ring member.

3. An electric box assembly as defined in claim 2 wherein said cam follower means comprises a plurality of sets of lugs, each set being positioned at a different distance from said flange on said outlet box member, whereby said assembly can accommodate panels of thicknesses varying by more than can be accommodated by a single set of lugs at a single distance from said flange.

4. An electric box assembly as defined in claim 3 wherein each lug of each set is axially aligned on said outlet box member with a lug of the other sets.

5. An electric box assembly as defined in claim 1 wherein said flange on said outlet box has a recess for receiving one end of the sidewall of said ring member.

6. An electric box assembly as defined in claim 1 wherein said cam follower means comprises lug means extending outwardly from the sidewall of said outlet box member, said lug means having a profile on the surface thereof which engages said cam track means and which cooperates with said cam track means to lock said outlet box member relative to said ring member.

7. An electric box assembly as defined in claim 6 wherein said lug means is formed of a harder material than said cam track means and has a tooth profile on the surface thereof that engages said cam track means, the surface of said cam track means that is engaged by said lug means being substantially smooth, whereby said lug means bites into said cam track means as said outlet box member is rotated relative to said ring member to retain said outlet box member on said ring member as said flanges move into compressive engagement with the panel.

8. An electric box assembly as defined in claim 6 wherein said cam track means comprises ratchet means having a plurality of crests and troughs, one of said crests and troughs being disposed closest to said flange on said ring member, and each successive crest and trough being disposed progressively further from said flange, said lug means having a surface profile that is shaped generally complementarily with respect to the shape of said cam track means for retaining said outlet box member on said ring member.

9. An electric box assembly as defined in claim 1 wherein said sidewall of said ring member has a first end and a second end, said flange on said ring member being positioned intermediate said first and second ends.

10. An electric box assembly as defined in claim 9 wherein said flange on said ring member is positioned closer to one of said ends than to the other of said ends, whereby said ring member can be reversed from a first position wherein a first surface of said ring member flange is adapted to bear against said one surface of said panel and the portion of said ring member sidewall between said ring member flange and said one end engages the wall of said opening, to a second position wherein a second surface of said ring member flange is adapted to bear against said one surface of said panel and the portion of said ring member sidewall between said ring member flange and said other of said ends engages the wall of said opening, to accommodate panels of thicknesses varying more than can be accommodated by the ring member in either position.

11. An electric box assembly as defined in claim 1 wherein the surfaces of said cam follower means and said cam track means which are adapted to engage one another are roughened to lock said outlet box member on said ring member.

12. An electric box assembly as defined in claim 1 wherein the outer surface of said ring member sidewall is provided with ribs to increase the frictional retentive engagement of the ring member with the wall of said opening.

13. An electric box assembly as defined in claim 1 wherein the surface of said flange on said ring member which is adapted to bear against one surface of said panel is provided with projections which bite into said panel as said ring member flange is moved into clamping engagement with said panel to thereby prevent said ring member from rotating relative to said panel as said outlet box member is rotated relative to said ring member.

14. An electric box assembly as defined in claim 1 wherein said sidewall on said outlet box member has a first end and a second end, said flange on said outlet box member extending outwardly from the first end of said sidewall on said outlet box member, and further comprising a top wall enclosing said second end of said sidewall on said outlet box member, said outlet box member sidewall being provided with knock-outs to enable the entry of electrical cables into said outlet box.

15. An electric box assembly for mounting an outlet box within an opening extending between opposite surfaces of a panel, comprising: a ring member having a sidewall adapted to be inserted into and seated within said opening said sidewall having inner and outer surfaces, a first flange extending outwardly from the outer surface of said sidewall and adapted to bear against one surface of said panel, and first cam means on one of said surfaces of said sidewall; and an outlet box meamber having a sidewall adapted to be positioned within the sidewall of said ring member, a second flange extending outwardly from the sidewall of said outlet box member and adapted to bear against the surface of said panel opposite to the surface engaged by said first flange on said ring member, and second cam means on the sidewall of said outlet box member and adapted to engage said first cam means when said outlet box member is moved relative to said ring member, said second cam means including a plurality of sets of lugs, each set of lugs being located on a plane extending parallel to said second flange with the respective planes being spaced different distances from said second flange, so any one of said plurality of sets of lugs can cooperate with said first cam means to move the flanges on said ring member and outlet box member with respect to one another to clampingly engage said panel therebetween, whereby to accommodate panels of different thickness.

16. An electric box assembly as defined in claim 15 wherein said ring member is formed of a material with an inherently elastic memory, said sidewall being discontinuous and defining a gap to permit said ring member sidewall to be spread apart from a relaxed position, wherein the diameter of said outer surface is greater than the diameter of said opening to a spread position wherein the gap is greater than the thickness of the panel whereby the ring member may be inserted through said panel opening by (1) placing one portion of the sidewall adjacent the gap outside the panel, and (2) rotating the ring member relative to the panel to position the entire ring member outside the panel and in the relaxed position, said ring member then being insertable in said opening by (1) compressing the ring member from said relaxed position to a compressed position wherein the diameter of said outer surface is smaller than the diameter of said opening, (2) telescopically inserting said ring member in said opening until the flange thereon engages said one panel surface, and (3) releasing the force compressing said ring member whereby the inherent elastic memory of said ring member urges said sidewall toward said relaxed position to position the outer surface of said sidewall in frictional retentive engagement with the wall of said opening.

17. An electric box assembly as defined in claim 15 wherein said sidewall on said ring member has a first end and a second end, said flange on said ring member is positioned closer to one of said ends than to the other of said ends, whereby said ring member can be reversed from a first position wherein a first surface of said ring member flange is adapted to bear against said one surface of said panel and the portion of said ring member sidewall between said ring member flange and said one end engages the wall of said opening, to a second position wherein a second surface of said ring member flange is adapted to bear against said one surface of said panel and the portion of said ring member sidewall between said ring member flange and said other of said ends engages the wall of said opening, to accommodate panels of thicknesses varying more than can be accommodated by the ring member in either position.

18. An electric box assembly as defined in claim 15 wherein said first cam means comprises means on the inner surface of said ring member sidewall defining cam track means inclined away from the end of the ring member inserted in the panel opening.

19. An electric box assembly for mounting an outlet box within an opening extending between opposite surfaces of a panel, comprising: a ring formed of a material with an inherently elastic memory and having a generally cylindrically-shaped sidewall having inner and outer surfaces adapted to be inserted into and seated within said opening and having first and second edges; a flange extending outwardly from the outer surface of said sidewall and adapted to bear against one surface of said panel, said flange being located opposite ends of said sidewall and closer to one sidewall end than the other sidewall end; and means on the inner surfaces of said sidewall defining cam track means inclined away from the end of the ring member inserted into the panel opening and defining a ratchet means having a plurality of alternating crests and troughs on a bearing surface of the cam track means, said sidewall being discontinuous and defining a gap to permit said ring member sidewall to be spread apart from a relaxed position, wherein the diameter of said outer surface is greater than the diameter of said opening to a spread position wherein the gap is greater than the thickness of the panel whereby the ring member may be inserted through said panel opening by (1) placing one portion of the sidewall adjacent the gap outside the panel, and (2) rotating the ring member relative to the panel to position the entire ring member outside the panel and in the relaxed position, said ring member then being insertable in said opening by (1) compressing the ring member from said relaxed position to a compressed position wherein the diameter of said outer surface is smaller than the diameter of said opening, (2) telescopically inserting said ring member in said opening until the flange thereon engages said one panel surface, and (3) releasing the force compressing said ring member whereby the inherent elastic memory of said ring member urges said sidewall toward said relaxed position to position the outer surface of said sidewall between said flange and one sidewall end in frictional retentive engagement with the wall of said opening, said ring member being reversible from a first position wherein one surface of said flange is adapted to bear against said one surface of said panel and the portion of said sidewall between said flange and said one end engages the wall of said opening, to a second position wherein a second surface of said flange is adapted to bear against said one surface of said panel and the portion of said sidewall between said flange and said other of said ends engages the wall of said opening, to thereby accommodate panels of greater variation thickness than when the ring is in either position; and an outlet box member having a sidewall adapted to be positioned within the sidewall of said ring member; a flange extending outwardly from the sidewall of said outlet box member and adapted to bear against the opposite surface of said panel; and cam follower means on the sidewall of said outlet box member and having a bearing surface adapted to engage said cam track means when said outlet box member is rotated relative to said ring member; said bearing surface having a profile generally complementary to the shape of said cam track means and receivable in said troughs between successive crests, whereby said cam and cam follower means cooperate to move the flanges on said ring member and outlet box member toward one another and into clamping engagement with said panel, as said cam follower means moves along said inclined cam track means, and said cam follower means and cam track means cooperate to minimize the possibility of dislodgement of said outlet box member from said ring member.

20. A ring member for an electric box assembly for mounting an outlet box within an opening extending between opposite surfaces of a panel, comprising a generally cylindrical sidewall adapted to be seated within said opening, said sidewall having inner and outer surfaces and opposite ends, a flange integral with said sidewall and extending outwardly from said outer surface, said flange having first and second opposed surfaces extending perpendicular to the axis of said generally cylindrical sidewall, said first surface of said flange being spaced a greater distance from one end of said sidewall than said second surface is spaced from the opposite end of said sidewall, said sidewall and flange being formed of a material with an inherent elastic memory and being discontinuous to define a gap permitting said ring member sidewall to be spread apart and compressed from a relaxed position, and a plurality of circumferentially spaced cam tracks integral with said sidewall and extending inwardly from said inner surface, each of cam tracks comprising a thin rib having opposed parallel surfaces inclined with respect to a plane extending parallel to said first and second surfaces of said flange, said ribs having opposite ends respectively located on planes extending parallel to said plane so that either of said first and second surfaces can be positioned to engage a surface of said panel to accommodate panels of different thickness.

21. An outlet box adapted to cooperate with a ring member having a set of circumferentially spaced cam tracks with the adjacent ends of each pair of cam tracks spaced from each other, the total circumferential dimension of the cam tracks encompassing substantially the entire ring and the total spacing between adjacent cam tracks being a small fraction of the overall circumferential dimension of the ring, said outlet box comprising a cylindrical sidewall having a first end and a second end, a flange extending outwardly from said first end of said sidewall and defining a surface between said ends which extends perpendicular to a center axis of said cylindrical sidewall, a plurality of sets of circumferentially spaced lugs extending outwardly from said sidewall with each set of lugs located on a plane extending parallel to said surface and the respective planes being spaced different distances from said surface, the circumferential dimension of each lug being less than the spacing between adjacent pairs of cam tracks so that the total circumferential dimension of each set of lugs is less than said small fraction, each of said circumferentially spaced lugs of one set being axially aligned with a lug of the other sets so that said outlet box may be inserted through a ring member having a single set of cam track members equal in number to the lugs in a set and the lugs of a set engage the respective cam track members.

22. An outlet box as defined in claim 21 wherein said flange has a recess which defines a well.

23. An outlet box as defined in claim 21, further including a top wall enclosing said second end of said sidewall.

24. An outlet box as defined in claim 23, in which said sidewall has knock-outs to enable the entry of electrical cables.

* * * * *